Jan. 1, 1963 J. A. RAJCHMAN 3,071,754

MAGNETIC MEMORY SYSTEMS USING TRANSFLUXORS

Filed April 2, 1957 3 Sheets-Sheet 1

RESET

STORE BINARY "1" DIGIT

STORE BINARY "0" DIGIT

INVENTOR.
Jan A. Rajchman
BY Morris A. Rabkin
ATTORNEY.

INVENTOR.
Jan A. Rajchman
BY Morris Lakin
ATTORNEY.

INVENTOR.
Jan A. Rajchman
BY
Morris A. Rabkin
ATTORNEY.

3,071,754
Patented Jan. 1, 1963

3,071,754
MAGNETIC MEMORY SYSTEMS USING TRANSFLUXORS

Jan A. Rajchman, Princeton, N.J., assignor to Radio Corporation of America, a corporation of Delaware Filed Apr. 2, 1957, Ser. No. 650,155
10 Claims. (Cl. 340—174)

This invention relates to magnetic memory systems, and particularly to memory systems using transfluxors.

An article by J. A. Rajchman and A. W. Lo, entitled "The Transfluxor," and published in the March 1956 issue of the Proceedings of the IRE, pages 321–332, describes the construction and the operation of transfluxors. A transfluxor includes a core of rectangular hysteresis loop magnetic material having two or more apertures.

An important factor in the operation of rectangular hysteresis loop materials in multi-coordinate selection systems is the so-called switching time. By switching time is meant the time required to change the material between its two remanent states, using a given value of applied magnetizing force. It is found that the switching time is approximately inversely proportional to the amplitude of the applied magnetizing force. In certain memory systems using multi-apertured cores, the operating speed is limited because, when relatively short-duration selecting pulses are used, undesired flux changes are produced in non-selected ones of the cores.

It is among the objects of the present invention to provide improved magnetic memory systems which can be operated at relatively high speeds.

Another object of the present invention is to provide improved magnetic memory systems using transfluxors, which systems retain the advantages of transfluxors and which can be operated at higher speeds than certain prior systems using simple coincident-current techniques.

Still another object of the invention is to provide improved memory systems, wherein stored information of one kind is represented by one polarity of read-out signal, and stored information of another kind is represented by the opposite-polarity read-out signal.

Memory systems according to the present invention use one or more transfluxors each having at least three apertures. The aperture walls define four legs. Two separate flux paths of substantially equal length also are provided. One leg is common to both flux paths, and two of the other three legs are individual to a different one of the two paths. A bias magnetizing force is applied to maintain the common leg in an initial direction of magnetization. A selecting magnetizing force is applied along both flux paths in a direction to change the flux in the common leg from the initial to the other direction of magnetization. The flux change produced in the common leg is steered to either one or both of the other two legs of these flux paths in accordance with their initial remanent states. The difference between the flux changes in the two legs represents the information initially stored in the transfluxor. After the selecting magnetizing force is terminated, both legs are magnetized in the same direction.

The bias magnetizing force then changes the flux in the common leg to its initial direction of magnetization. A control magnetizing force of one polarity applied to both legs steers the flux change in the common leg to a first of the other two legs, and a control magnetizing force of the opposite polarity steers the flux change in the common leg to the second of the other two legs. By varying the amount of control magnetizing force, the flux change in the common leg can be divided in desired amounts between the other two legs.

A feature of the invention is that the switching of information into and out of a core does not depend upon electrical linkages between flux paths in separate cores. Instead, the information is switched by a direct, magnetic transfer of flux between different paths of the same core. The operation of the memory systems of the invention is efficient and can be as fast as desired because a substantially constant amount of flux is changed, even when operating signals of relatively large amplitude and of relatively short duration are used.

In the accompanying drawings:

FIG. 1 is a schematic diagram of a memory system according to the invention;

FIGS. 2, 3 and 4, respectively, are each a schematic diagram illustrating the flux pattern in the core of FIG. 1 during different portions of an operating cycle;

Figure 1:
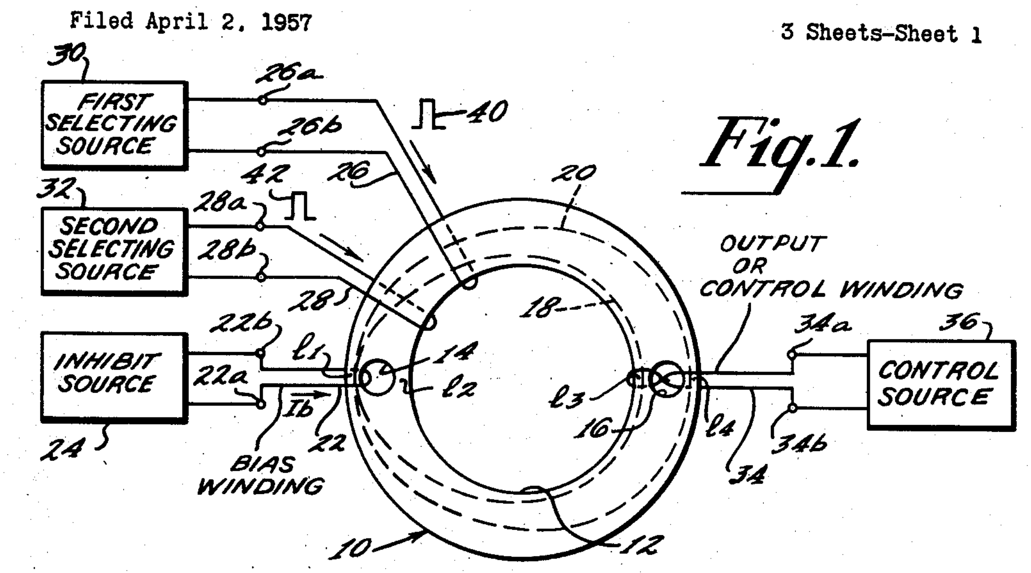

The transfluxor core 10 of FIG. 1 is similar to the transfluxor core shown in FIG. 17 of the aforementioned article by Rajchman and Lo, and has a central aperture 12, a bias aperture 14 and an output aperture 16 located on either side of the central aperture 12. The peripheral dimension of the central aperture 12 is made relatively large compared to the peripheral dimensions of either one of the bias and output apertures 14 and 16. The three apertures of the core 10 provide a pair of bias legs $l_1$ and $l_2$, of which leg $l_1$ is the common leg, and a pair of output legs $l_3$ and $l_4$. Each of the legs $l_1$, $l_2$, $l_3$ and $l_4$ are of substantially equal cross-sectional area. A first flux path, indicated by the dotted line 18, includes the common leg $l_1$ and a first output leg $l_3$. A second flux path, indicated by the dotted line 20, includes the common leg $l_1$ and the other output leg $l_4$. By making the diameter of the central aperture 12 relatively large compared to the diameter of the output aperture 16, the two flux paths 18 and 20 are made to have substantially equal circumferential lengths.

An inhibit winding 22 is threaded through the bias aperture 14. Beginning at one terminal **22*a*, the inhibit winding 22 is brought across the top surface of the core 10, then through the bias aperture 14, and then across the bottom surface of the core 10 to the other terminal 22*b*. The terminals of the bias winding 22 are connected to an inhibit source 24. The inhibit source 24 is arranged to provide a D.C. (direct current) bias current to the inhibit winding 22 in a direction of flow (conventional) from the terminal 22*a* to the other terminal 22*b***.

A plurality of selecting windings are threaded through the central aperture of the core 12. In FIG. 1, a pair of selecting windings 26 and 28, for example, are threaded through the central aperture 12 to link both the flux paths 18 and 20. Beginning at one terminal **26*a*, a first selecting winding 26 is brought across the bottom surface of the core 10, then through the central aperture 12, and then across the top surface of the core 10 to the other terminal 26*b*. The second selecting winding 28 is similarly threaded through the central aperture 12 to link both the flux paths 18 and 20. The first and second selecting windings 26 and 28 are connected to first and second selecting sources 30 and 32, respectively. It is understood that more than two selecting windings can be linked to the core 10. For example, in certain coordinate groupings of a plurality of the cores 10, three or more selecting windings may be linked to each core 10**.

A control winding 34 is coupled through both the output aperture 16 and the central aperture 12 of the core 10 in figure-eight fashion. Beginning at one terminal 34*a*, the conrol winding 34 is brought across the top surface of the core 10, then downwardly through the output aperture 16, and across the bottom surface of the core, then upwardly through the central aperture 12, and across the top surface of the core 10, and then downwardly through the output aperture 16, and across the bottom surface of the core 10 to the other terminal 34*b*. the terminals of the control winding 34 are connected to a control source 36.

The first and second selecting sources 30 and 32 are preferably constant-current sources such as other magnetic core or pentode-type amplifier circuits. The first and second selecting sources 30 and 32 may be controlled by any suitable means, such as a digital computer. The control source 36 may be any suitable source arranged to supply both positive and negative-polarity control pulses selectively to the control winding 34. The control source 36 may be operated by any suitable device, such as the logic portion of a digital computer system.

Figures 2, 3:
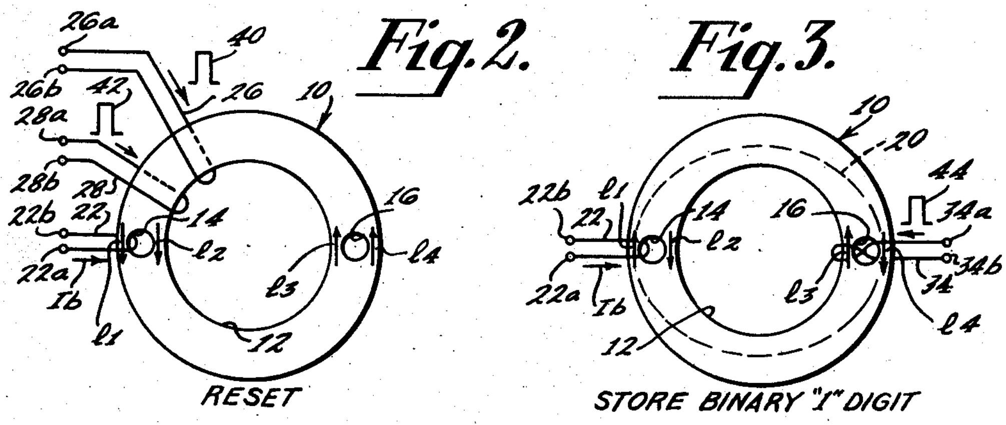

In operation, each operating cycle is divided into a read portion and a write portion. During the read portion of the cycle, selecting pulses 40 and 42 are applied concurrently to the first and second selecting windings 26 and 28 by the first and second selecting sources 30 and 32, respectively. Each of the selecting pulses 40, 42 is regulated in amplitude such that sufficient net magnetizing force is applied to the core 10 by the selecting pulses to change the flux in the common leg $\mathbf{l}_1$ and the legs $\mathbf{l}_3$ and $\mathbf{l}_4$ to the counterclockwise sense. Note that the selecting magnetizing forces are opposed by the bias magnetizing force produced by the bias current I*b* in the inhibit winding 22. The flux pattern in a core 10, after the read portion of the operating cycle, is indicated in FIG. 2 by arrows in each of the legs $\mathbf{l}_1$ through $\mathbf{l}_4$. In the reset condition, the flux in each of the legs is oriented in the one sense, for example, the counterclockwise sense with reference to the central aperture 12.

After the selecting pulses 40 and 42 are terminated, the bias current I*b* flowing in the inhibit winding 22 produces a flux change in the common leg $\mathbf{l}_1$, and in one or both of the output legs $\mathbf{l}_3$ and $\mathbf{l}_4$, from the counterclockwise to the clockwise sense, with reference to the central aperture 12. For example, referring to FIG. 3, one binary digit, for example, a binary 1 digit, is written into the core 10 by applying a positive control pulse 44 to the control winding 34. After the selecting pulses 40 and 42 are terminated, the positive control pulse 44 produces a current flow (conventional) in the control winding from the terminal 34*a* to the terminal 34*b*. The control pulse 44 applies one polarity magnetizing force to the output leg $\mathbf{l}_3$ in a direction to maintain the leg $\mathbf{l}_3$ in its initial, counterclockwise sense. The control pulse 44 applies an opposite-polarity magnetizing force to the leg $\mathbf{l}_4$ in a direction to reverse the flux in the leg $\mathbf{l}_4$ from the counterclockwise to the clockwise sense, with reference to the central aperture 12. Accordingly, the combined action of the bias current I*b* flowing in the bias winding 22, and the positive control pulse 44, is to produce a flux change along the second flux path 20, including the common leg $\mathbf{l}_1$ and the output leg $\mathbf{l}_4$. Substantially no flux change is produced in the other output leg $\mathbf{l}_3$ because the control pulse 44 holds the leg $\mathbf{l}_3$ in its initial reset direction. Accordingly, after the control pulse 44 is terminated, the outside legs $\mathbf{l}_1$ and $\mathbf{l}_4$ are saturated with flux in the clockwise sense, with reference to the central aperture 12; and the inside legs $\mathbf{l}_2$ and $\mathbf{l}_3$ are saturated with flux in the counterclockwise sense, with reference to the central aperture 12.

Figure 4:
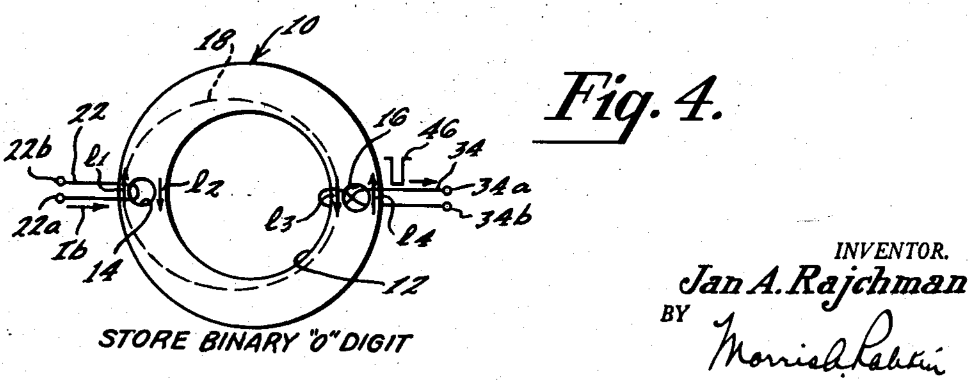

The complement of the one binary digit, for example, the binary 0 digit, can be written into the core 10 by applying a negative polarity control pulse 46 to the control winding 34 during the write portion of the operating cycle. The negative control pulse 46 applies the one magnetizing force to the leg $\mathbf{l}_3$ in a direction to reverse the flux in this leg from the counterclockwise to the clockwise sense, with reference to the central aperture 12. The negative control pulse 46 also applies the opposite-polarity magnetizing force to the leg $\mathbf{l}_4$ in a direction to maintain the flux in this leg in the initial, counterclockwise sense, with reference to the central aperture 12. Accordingly, the combined effect of the bias current I*b* and the negative-polarity control pulse 46 is to produce a flux change along the first flux path 18, including the legs $\mathbf{l}_1$ and $\mathbf{l}_3$. After the negative control pulse 46 is terminated, the flux in the outside leg $\mathbf{l}_1$ and the inside leg $\mathbf{l}_3$ is oriented in the clockwise sense, with reference to the central aperture 12; and the flux in the inside leg $\mathbf{l}^2$ and the outside leg $\mathbf{l}_4$ is oriented in the counterclockwise sense with reference to the central aperture 12. FIG. 4 indicates the flux pattern in a core 10 when a negative control pulse 46 is applied. Observe that the flux in the middle leg $\mathbf{l}_2$ is not changed during the read or the write portions of the operating cycle of the system of FIG. 1. The middle leg $\mathbf{l}_2$ serves as a dummy leg in order to maintain the algebraic sum of the fluxes, through a plane intersecting each of the legs, equal to a zero value.

If no control pulse were applied to the control winding 34 after termination of the selecting pulses 40 and 42, the flux change in the common leg $\mathbf{l}_1$ would divide substantially equally between the legs $\mathbf{l}_3$ and $\mathbf{l}_4$, because neither one of these legs is favored by an additional control magnetizing force. Accordingly, approximately half of the flux in the common leg $\mathbf{l}_1$ would be steered along the first flux path 18 (FIG. 4) to the inside leg $\mathbf{l}_3$, and the other half of the flux change in the common leg $\mathbf{l}_1$ would be steered along the second flux path 20 to the outside leg $\mathbf{l}_4$. Accordingly, by varying the amplitude of the control pulses applied to the control winding 34, the flux change in the common leg $\mathbf{l}_1$ may be split in any desired portions between the two output legs $\mathbf{l}_3$ and $\mathbf{l}_4$. Therefore, if desired, analog-type information may be stored in the core 10. Thus, by controlling the amplitude of the control pulse, applied to the control winding 34, different amounts of flux are set in the legs $\mathbf{l}_3$ and $\mathbf{l}_4$ corresponding to the analog information.

During the read operation, an output signal is induced in an output winding (not shown), wound in figure-eight fashion, around the legs $\mathbf{l}_3$ and $\mathbf{l}_4$. The control winding 34 also may serve as the output winding for the core 10. In such case, the control source 36 also receives output signals corresponding to the stored information. For example, when the flux in the leg $\mathbf{l}_4$ is initially oriented in the clockwise sense, the selecting pulses 40 and 42 produce a flux change along the path 20, including the legs $\mathbf{l}_1$ and $\mathbf{l}_4$, from the clockwise to the counterclockwise sense, with reference to the central aperture 12. Substantially no flux change is produced in the leg $\mathbf{l}_3$, during the read operation, because this leg already is saturated with flux in the counterclockwise sense, with reference to the aperture 12. Accordingly, the flux change in the leg $\mathbf{l}_4$ induces a voltage of one polarity in the control (now output) winding 34. However, when the leg $\mathbf{l}_3$ is saturated with flux in the clockwise sense, with reference to the central aperture 12, the selecting pulses 40 and 42 produce a flux change along the path 18, including the common leg $\mathbf{l}_1$ and the leg $\mathbf{l}_3$. Substantially no flux change is produced in the leg $\mathbf{l}_4$ because this leg already is saturated with flux in the counterclockwise sense, with reference to the central aperture 12. Accordingly, an output voltage of the opposite polarity is induced in the control (now output) winding 34. Similarly, when varying amounts of flux are stored in the two legs $\mathbf{l}_3$ and $\mathbf{l}_4$, varying amounts of output signal of either one or the other polarity are induced in the control (now output) winding 34.

The output signal induced in the winding 34 can be varied between a maximum negative value, in incremental steps, to a maximum positive value by decreasing the amplitudes of the control signals 44 and 46 in incremental steps towards a zero value. The response curve of the net output signal induced in the control (now output) winding 34, as a function of control signals previously applied to the control winding 34, is similar to the curve shown in FIG. 15 of an article by Jan A. Rajchman, entitled "Ferrite Apertured Plate for Random Access Memory," and published in the March 1957 Proceedings of the IRE, pages 325–334. For substantially equal length flux paths 18 and 20 (FIG. 1), the response curve passes through the origin of the graph, as does the curve of FIG. 15 of the aforesaid article. Similarly, for flux paths 18 and 20 of unequal, circumferential lengths, the curve is displaced in an upward or a downward direction, as indicated by the dotted curves of the article by Rajchman. Substantially equal flux paths 18 and 20 also can be obtained by varying the geometry of the core 10, as described hereinafter.

Figure 5:
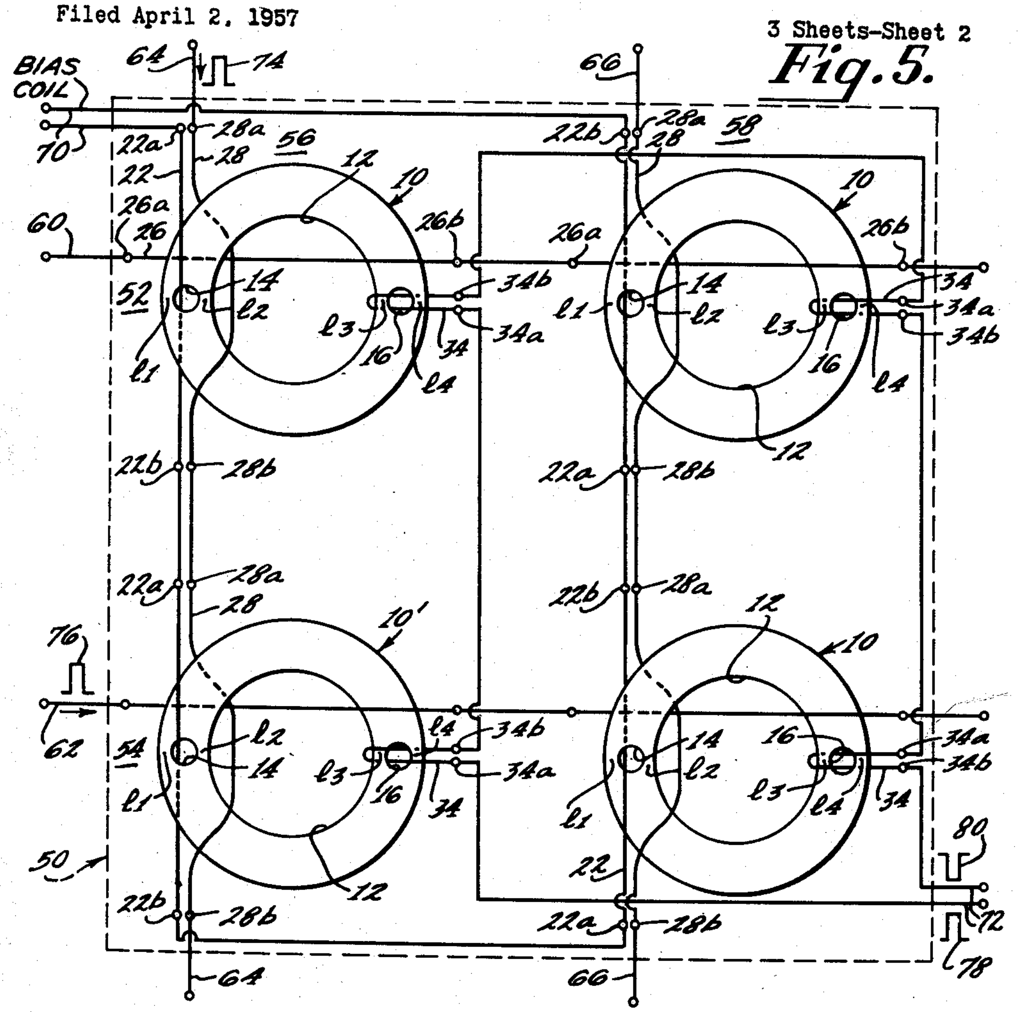
FIG. 5 is a schematic diagram of a two-dimensional array according to the invention.

A plurality of the systems of FIG. 1 can be arranged in a random access memory array for selectively writing and reading information into desired cores of the array at relatively high speeds. For example, a 2 x 2 array of the cores 10 is shown schematically in FIG. 5. The cores 10 are arranged in an array 50 having two rows 52 and 54 and two columns 56 and 58 of the cores 10. A first row coil 60 is formed by connecting the first selecting windings 26 of the first row of cores 10 in series with each other. The terminal **26*b* of one first selecting winding is connected to the terminal 26*a* of a succeeding first selecting winding. A second row coil 62 is formed by connecting the first selecting windings 26 of the second row of cores 10 in series with each other in similar fashion. A first column coil 64 is formed by connecting the second selecting windings 28 of the first column of cores 10 in series with each other. The terminal 28*a* of one second selecting winding 28*b* is connected to the terminal 28*a* of the succeeding second selecting winding 28. A second column coil 66 is formed in similar fashion by connecting the second selecting windings 28 of the other column of cores 10 in series with each other. A common D.C. bias coil 70 is linked to all the cores 10 by connecting the separate bias windings 22 of the cores 10 in series with each other. A common control coil 12 is formed by connecting the individual control windings 34 of the cores 10** in series with each other.

In operation, a desired core 10, for example, the core 10′ at the intersection of the second row and first column, is selected during a read portion of the memory cycle by concurrently applying positive selecting pulses 74 and 76 to the first column coil 64 and the second row coil 62, respectively. The information stored in the selected core 10′ produces a voltage across the control coil 72, as a result of the voltage induced in the control winding 34 of the selected core 10′. After the information is read out of the selected core 10′, information may be written into the same core 10′ by applying either a positive control pulse 78 or a negative control pulse 80 to the control coil 72. Any other desired one of the cores 10 can be selected in similar fashion by applying concurrently selecting pulses to the row and the column coils linked thereto.

Figure 6:
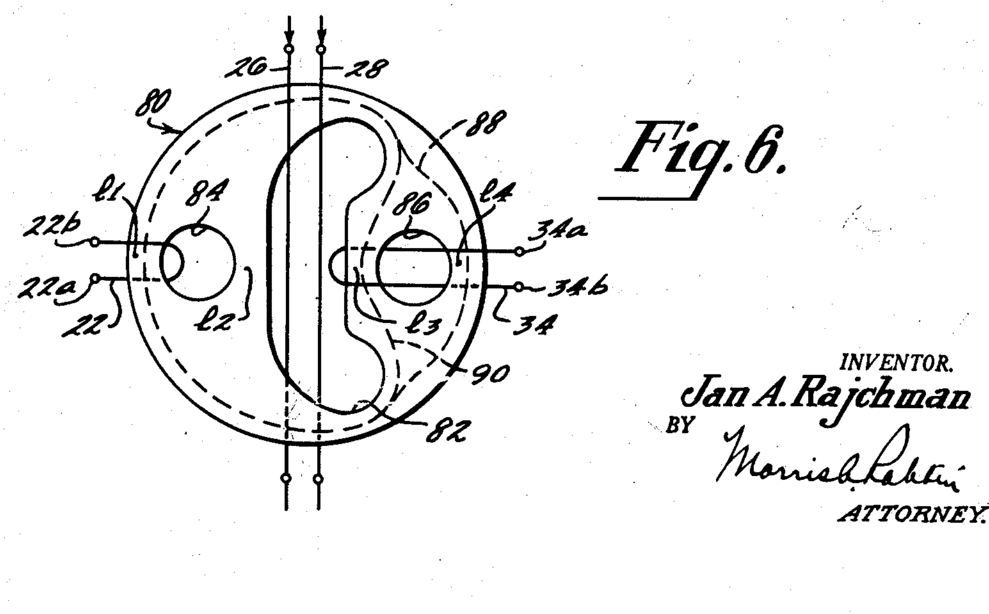
FIG. 6 is a schematic diagram of another form of three-apertured core which provides equal length flux paths in the core material.

FIG. 6 is a schematic diagram of a core 80 having a central aperture 82, a bias aperture 84, a control aperture 86, and providing substantially equal length flux paths 88 and 90 in the core 80. The aperture walls define four legs $l_1$, $l_2$, $l_3$ and $l_4$, each of substantially equal cross-sectional area. The central aperture 82 is elongated along a line perpendicular to a center-line of the core 80 which includes the bias and the control apertures 84 and 86. The central aperture 82 also is elongated at its upper and lower extremities towards the control aperture 86. The core 80 may be formed, for example, by molding substantially rectangular hysteresis loop ferrite powder, using a die shaped in the form of a core 80. A plurality of selecting windings, for example, a pair of selecting windings 20 and 28, are linked to both the flux paths 88 and 90, as described for the core 10 of FIG. 1. Similarly, an inhibit winding 22 is threaded through the bias aperture 84 to link both the paths 88 and 90. The control winding 34 is wound in figure-eight fashion through the control aperture 86 and the central aperture 82.

Another core geometry for obtaining substantially equal length flux paths is one similar to the core 10 of FIG. 1, but having the axis of the control aperture 16 thereof located orthogonally in the core material. That is, the axis of the orthogonal aperture is perpendicular to the axis of the core 10. A core having such an orthogonal aperture is shown in FIG. 3 of a copending application filed February 29, 1956, by Hewitt D. Crane, entitled "Magnetic Systems," and bearing Serial No. 568,497 now U.S. Patent 2,810,901. The control aperture of the present invention corresponds to the orthogonal aperture 46 of the core of the aforesaid Crane patent. The other outer aperture 46 of the Crane patent is used as a bias aperture in systems according to the present invention.

Figure 7:
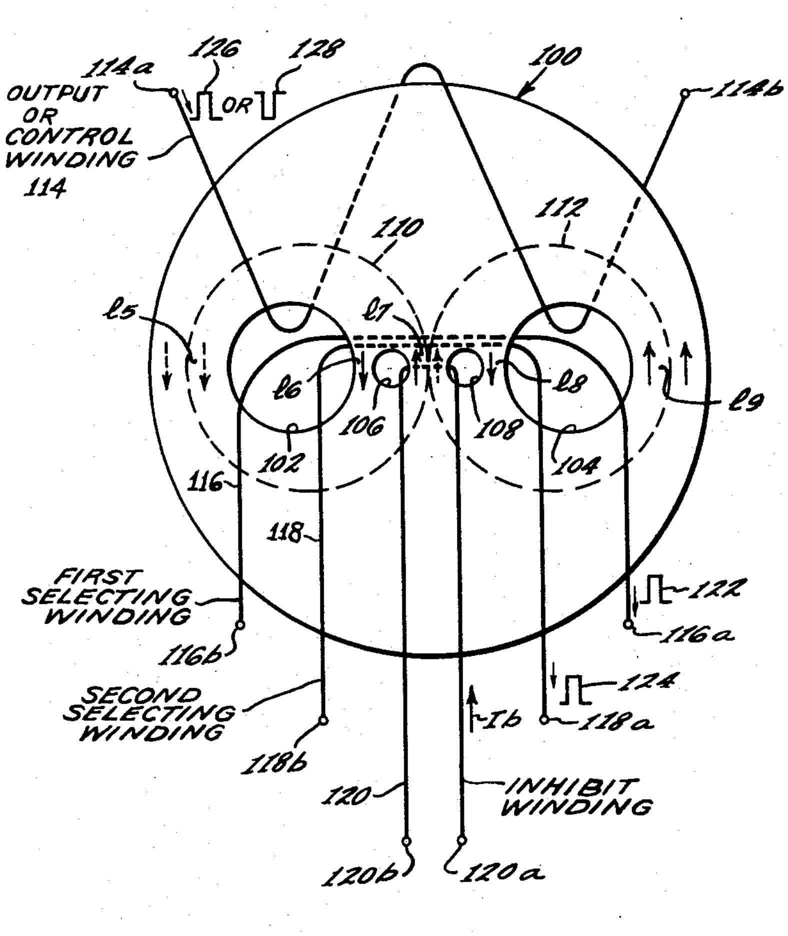
FIG. 7 is a schematic diagram of a memory system according to the invention, using a four-apertured magnetic core.

Another embodiment of the present invention, using four separate apertures in the core of rectangular hysteresis loop material, is shown in FIG. 7. The outside apertures 102 and 104 of the core 100 are used for both control and selection purposes during the read and write portions of an operating cycle. The inside pair of apertures 106 and 108 are used as bias apertures. The aperture walls define five separate legs $l_5$, $l_6$, $l_7$, $l_8$ and $l_9$ in the core. The middle leg $l_7$ is used as a common leg. Two separate flux paths are provided. One flux path, indicated by the dotted line 110, includes the common leg $l_7$ and the outside leg $l_5$; and the other flux path, indicated by the dotted line 112, includes the common leg $l_7$ and the other outside leg $l_9$. The middle apertures 106 and 107 are located in the material such that the cross-sectional area of the leg $l_7$ is at least equal to twice the cross-sectional area of each of the equal legs $l_6$ and $l_8$. The cross-sectional areas of the outside legs $l_5$ and $l_9$ are made at least equal to the cross-sectional area of the middle leg $l_7$. The radial dimensions of the apertures 102 and 104 are made substantially larger than the radial dimensions of either of the middle apertures 106 and 108, for reasons described more fully hereinafter.

A control winding 114 is linked to both flux paths 110 and 112 by being threaded through both outside apertures 102 and 104. Beginning at one terminal **114*a*, the control winding 114 is brought across the top surface of the core 100, then through the outside aperture 102, then along the bottom surface of the core 100 and around the edge of the core, then across the top surface of the core 100, then through the other outside aperture 104, and finally across the bottom surface of the core 100 to the other terminal 114*b*. A pair of selecting windings 116 and 118 also are threaded through both outside apertures to link both flux paths 110 and 112. Beginning at one terminal 116*a*, the first selecting winding 116 is brought across the top surface of the core 100, then through the outside aperture 104, then along the bottom surface of the core 100, and then through the other outside aperture 102 to the other terminal 116*b*. The second selecting winding 118 is similarly threaded through both the outside apertures 102 and 104. An inhibit winding 120 is wound on the common leg $l_7$ to bias the common leg $l_7$ of both the flux paths 110 and 112. Beginning at one terminal 120*a*, the inhibit winding 120 is brought across the top surface of the core, then through the right-central aperture 108, then across the bottom surface of the core 100, then through the left-central aperture 106, and then across the top surface of the core to the other terminal 120*b***.

In operation, the legs $l_6$ and $l_8$ remain saturated with flux in one sense, for example, the counterclockwise sense, with reference to the outside aperture 104. Positive selecting pulses 122 and 124, applied concurrently to the first and second selecting windings 116 and 118, orient the flux in the outside leg $1_9$ and in the middle leg $1_7$ in the counterclockwise sense and the flux in the other outside leg $1_5$ in the clockwise sense, with reference to the outside aperture 104. Note that an amount of flux change, equal to that produced in the middle leg $1_7$, is produced during the selecting operation. That is, the total flux change in both the outside legs $1_5$ and $1_9$ is limited to the amount of flux change that can be produced in the middle leg $1_7$. The total flux change is limited because each of the other legs $1_6$ and $1_8$ are already saturated with flux in the counterclockwise sense, with reference to the outside aperture 104. The flux change in the core 100, during the selection operation, induces a voltage of either one or the other polarity in the control winding 114.

The amplitude of the voltage induced in the control winding is proportional to the difference between the flux changes in the outside legs $1_5$ and $1_9$. Thus, a maximum voltage of one polarity is induced in the control winding 114 when the selecting pulse produces a flux change along only the first path 110; and a maximum voltage of the opposite polarity is induced in the control winding 114 when the selecting pulse produces a flux change only along the second flux path 112. After the selecting pulses 122 and 124 are terminated, the bias current $Ib$ applied to the inhibit winding 120 changes the flux in the middle leg $1_7$ from the counterclockwise to the clockwise sense, with reference to the outside aperture 104. The flux change in the middle leg $1_7$ is steered to one or the other of the outside legs $1_5$ and $1_9$ in accordance with the polarity of a control signal applied to the control winding 114. For example, a positive control pulse 126, applied to the control winding 114, holds the flux in the outside leg $1_5$ in the initial, clockwise sense, with reference to the outside aperture 104. Therefore, the flux in the outside leg $1_9$ is changed from the initial, counterclockwise to the clockwise sense, with reference to the outside aperture 104. Consequently, substantially all the flux change in the middle leg $1_7$ is steered to the outside leg $1_9$ by the positive control pulse 126.

The pair of dotted arrows in the middle leg $1_7$ and the pair of dotted arrows in the outside leg $1_5$ represent the flux change produced when a negative control pulse 128 is applied to the control winding 114. The latter flux change may correspond, for example, to the writing of a binary "0" digit in the core 100. Application of a negative control pulse 128 to the control winding 114 steers the flux change in the middle leg $1_7$ along the first flux path 110 to the other outside leg $1_5$. The negative control pulse 128 is in a direction to maintain the flux in the outside leg $1_9$ in its initial, counterclockwise sense with reference to the outside aperture 104. Accordingly, the other binary digit may be represented by steering the flux change in the middle leg $1_7$ to the outside leg $1_9$. Varying amounts of flux change in the leg $1_7$ may be divided between the two outside legs $1_5$ and $1_9$ by varying the amplitudes of the control signals 126 and 128. The outside apertures are made of relatively larger dimensions to prevent undesired flux changes in the legs $1_6$ and $1_8$ as a result of applying control pulses to the control winding 114. Note that the application of only a single selection pulse to the core 100, in the system of FIG. 7, does not produce any flux change in the core 100. Likewise, in combinatorial arrangements of an array of cores 100, a plurality of separate selecting coils can be linked to the array cores in such a manner that a desired array core is selected only when a given number of selecting coils are activated. The bias current $Ib$ prevents flux changes in the array cores when less than the given number of selecting coils are activated.

There have been described herein improved magnetic memory systems for obtaining relatively high-speed operation, using multi-apertured cores. The amount of flux changed during any portion of the operating cycle is constant. The flux transfer between the various magnetic circuits does not depend upon voltages induced in the various windings linked between the various flux paths. Accordingly, in systems according to invention, relatively efficient operation is achieved. Various modifications of the cores used in the systems of the invention have been described. For example, three-apertured cores with the axes of the respective apertures parallel to each other, or with the axis of one of the apertures orthogonal to the axes of others of the apertures may be used. Also, a core having four separate apertures may be used in the systems of the invention.

A plurality of individual memory systems of the invention may be arrayed in any desired groupings for coincident-current selection of a desired core. For example, the cores may be arranged in multi-cordinate arrays such as, for example, two-dimensional arrays having rows and columns. The arrays, for example, may be rectangular, square, or hexagonal arrays.

What is claimed is:

1. A magnetic system comprising a core of substantially rectangular hysteresis loop material having a plurality of apertures and having a pair of substantially equal length flux paths in said material, the walls of said apertures defining four different legs, a first of said flux paths including a first and a second of said legs, and the second of said flux paths including said first and a third of said legs, an inhibit winding coupled to said first leg to link both said paths, a selecting winding linking both said paths, and a control winding coupled to said second leg in one sense and coupled to said third leg in the sense opposite said one sense, means including said inhibit winding for producing a flux change in said first leg, and means including said control winding for controlling the division of said flux change in said first leg between said second and said third legs.

2. A magnetic system as recited in claim 1, said core having three apertures including a relatively central aperture and two relatively outer apertures, said first leg including the material between the wall of one of said outer apertures and the periphery of said core, said second leg including the material between the walls of said central and the other of said outer apertures, and said third leg including the material between the wall of said other outer aperture and the periphery of said core.

3. A magnetic system as recited in claim 1, the axes of said apertures being substantially parallel to each other.

4. A magnetic system as recited in claim 1, said apertures including a relatively central and two relatively outer apertures, said central aperture being elongated along one of its dimensions.

5. A magnetic system as recited in claim 1, said core having four apertures including a pair of relatively inner apertures and a pair of relatively outer apertures, said first leg including the material between the walls of said inner apertures, said second leg including the material between the wall of one of said outer apertures and the periphery of said core, and said third leg including the material between the wall of the other of said outer apertures and the periphery of said core.

6. A magnetic system comprising a core of substantially rectangular hysteresis loop material, said core having a plurality of apertures including a relatively central aperture and first and second outer apertures and having a pair of substantially equal length flux paths in said material, the walls of said apertures defining four different legs, a first of said flux paths including a first and a second of said legs, and the second of said flux paths including said first and a third of said legs, a selecting winding threading said central aperture and linking both said paths for producing a flux change in said core from an initial to the other direction of magnetization, an inhibit winding threading said first outer aperture and coupled to said first leg to link both said flux paths, means including said inhibit winding for producing a flux change in said first leg from said other to said initial direction of said magnetization, and a control winding linking said central aperture and said second outer aperture, said control winding coupled to said second leg in one sense and coupled to said third leg in the sense opposite the one sense, and means for selectively applying to said control winding a control signal of either one or the other polarity for controlling the division of said flux change in said first leg between said second and third legs.

7. A magnetic system as recited in claim 6, wherein said central aperture is elongated along one of its dimensions.

8. A magnetic system comprising a plurality of cores of substantially rectangular hysteresis loop material, each of said cores having a first, a second and a third aperture and a pair of substantially equal length flux paths in said material, the walls of said apertures defining four different legs, a first of said flux paths including a first and a second of said legs, and the second of said flux paths including said first and a third of said legs, a first plurality of selecting coils each threading said first apertures of a different group of said cores to link both said flux paths of each threaded core, a second plurality of selecting coils each threading said first apertures of another and different group of said cores, each combination of a different and another different group of said cores having certain cores in common and other cores not in common, a common inhibit winding threading said second apertures of all said cores and coupled to said first legs thereof to link both said flux paths in each core, a common control coil threading both said first and third apertures of all said cores and coupled to the second leg of any one core in one sense and coupled to said third leg of the same one core in the sense opposite said one sense, means including said inhibit coil and a pair of one first plurality and one second plurality selecting coils for producing a flux change in said first leg of a selected one of said cores, and means including said control coil for controlling the division of said flux change in said first leg of said selected one core between said second and said third legs of said selected core.

9. A magnetic system as recited in claim 8, said cores being arranged in rows and columns, said first plurality of selecting coils each linking a different row of said cores, and said second plurality of selecting coils each linking a different column of said cores.

10. A magnetic system as recited in claim 8, including means for writing information into a desired one of said cores comprising means for applying a selecting signal to that one of said first plurality of selecting coils linking said desired core, means for applying another selecting signal to that one of said second plurality of selecting coils linking said desired core, and means for applying selectively to said common control coil a control pulse of either the one or the other polarity, said control pulse being applied after the termination of said selecting signals.

References Cited in the file of this patent

UNITED STATES PATENTS

| | | |
|---|---|---|
| 2,734,184 | Rajchman | Feb. 7, 1956 |
| 2,736,880 | Forrester | Feb. 28, 1956 |
| 2,802,953 | Arsenault | Aug. 13, 1957 |
| 2,810,901 | Crane | Oct. 22, 1957 |
| 2,842,755 | Lamy | July 8, 1958 |
| 2,869,112 | Hunter | Jan. 13, 1959 |